July 9, 1963 L. LOWES ETAL 3,097,071
LIQUID-LIQUID CONTACTING APPARATUS
Filed Jan. 9, 1958 3 Sheets-Sheet 3

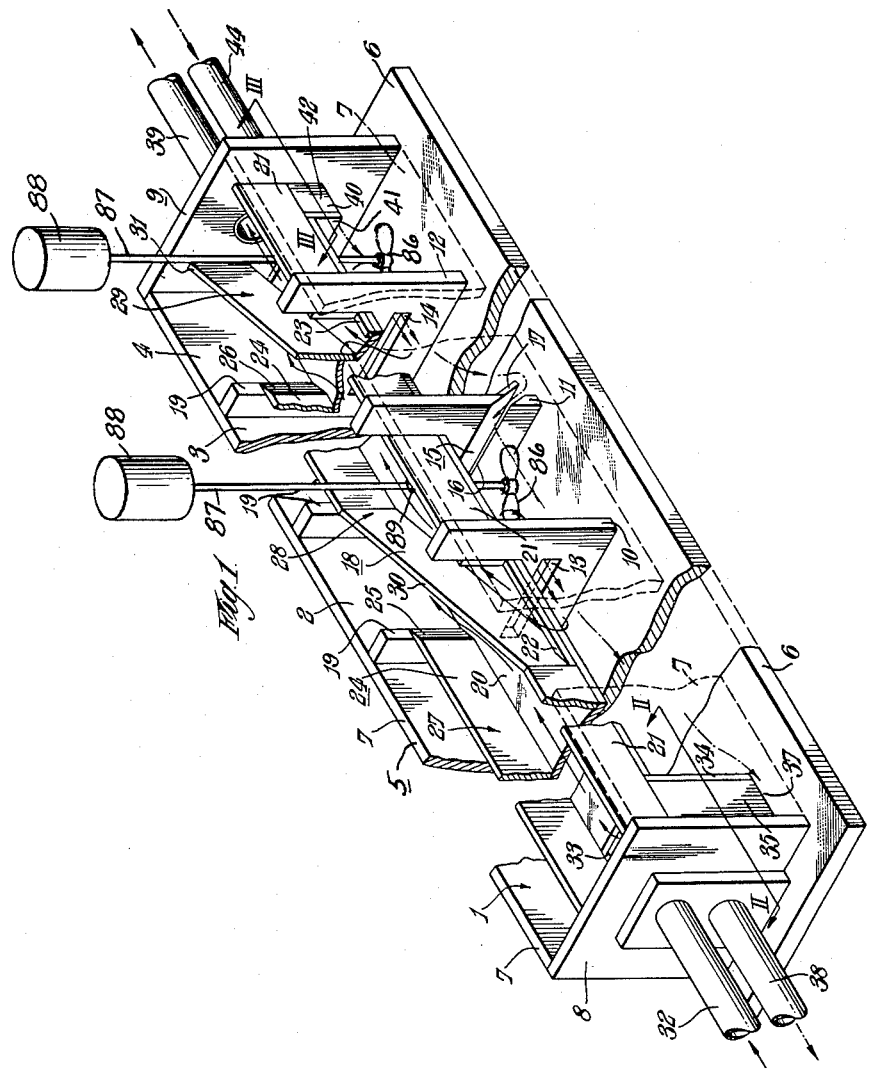

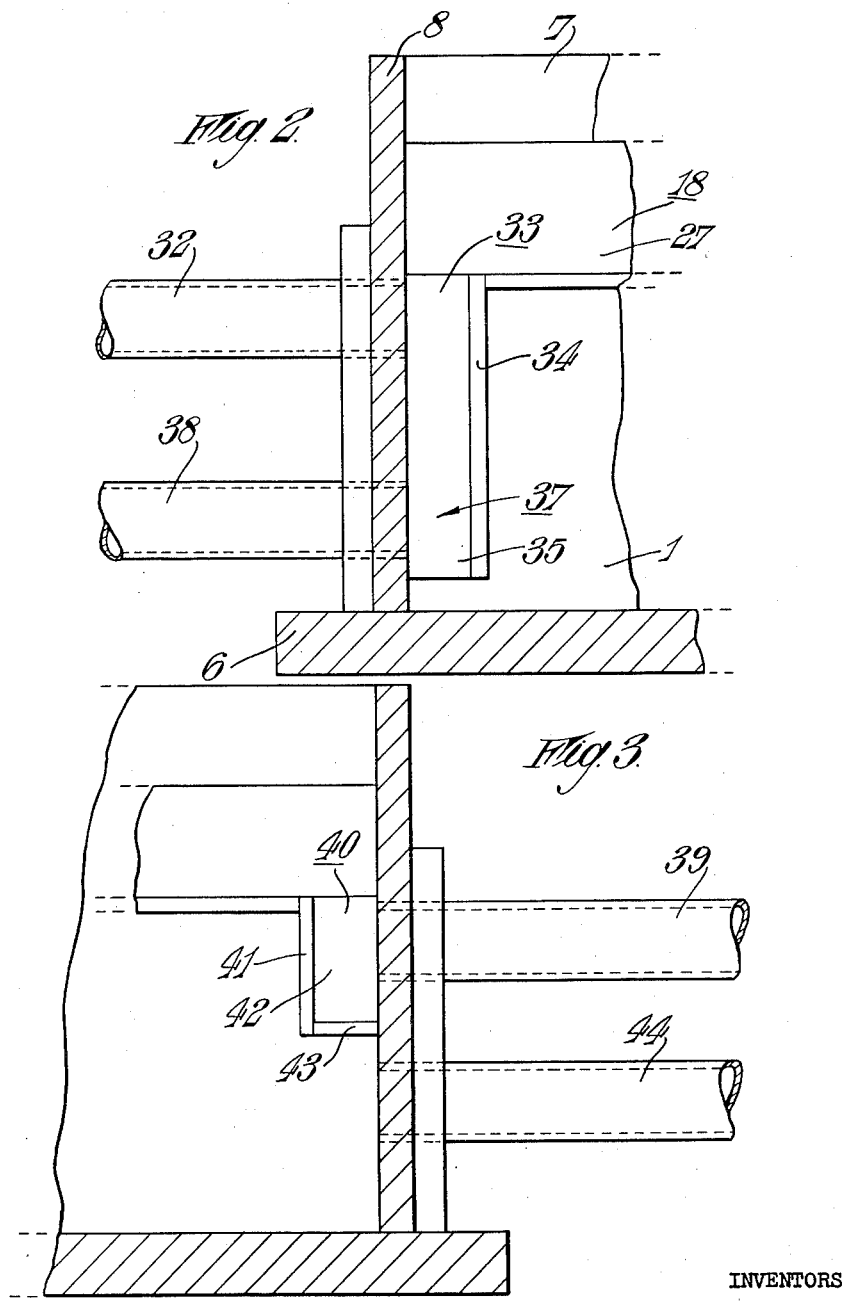

INVENTORS
LEONARD LOWES
MAURICE CHARLES TANNER
BY
ATTORNEYS 3,097,071
Patented July 9, 1963

3,097,071
LIQUID-LIQUID CONTACTING APPARATUS
Leonard Lowes, Seascale, and Maurice Charles Tanner, Mirehouse, Whitehaven, England, assignors to United Kingdom Atomic Energy Authority, London, England
Filed Jan. 9, 1958, Ser. No. 707,995
Claims priority, application Great Britain Jan. 10, 1957
2 Claims. (Cl. 23—270.5)

This invention relates to liquid-liquid contacting apparatus and is concerned with new forms of mixer-settler liquid-liquid contacting apparatus.

Conventional mixer settlers are normally constructed in what may be termed a "staggered" arrangement i.e., two lines of alternate mixer and settler compartments are arranged side by side so that mixer compartments in the one line are opposite to settler compartments in the other line. The above construction provides an arrangement in which the conveyance of liquids between compartments is simply done by providing ports through interconnecting walls in the structure, no pipework being normally required as associated mixers and settlers are adjacent to each other. For reasons of space and other considerations such as supercriticality when handling certain nuclear fissile materials in solution it is sometimes necessary to use an "in line" arrangement of mixer settlers, i.e., one in which there is a single line of alternate mixer and settler compartments. The construction of such an "in line" arrangement is complicated in that conveyance of liquids between associated mixer and settler compartments, which are not adjacent in the "in line" arrangement, has to be provided for, such as by special pipes or channels.

The present invention provides an "in line" mixer settler arrangement of simplified construction requiring no external pipework connecting between mixers and settlers.

According to the invention an "in line" mixer settler for contacting two substantially immiscible fluid phases of differing densities comprises a trough divided by transverse partitions to provide an even number of alternately arranged mixer and settler compartments 1, 2, 3, 4 . . . (n—1), n, longitudinal partitions providing fluid flow paths between compartments 1 and 4, 3 and 6 . . . (n—3) and n, for fluid flow of one fluid phase from settler compartments into appropriate mixer compartments, openings in the transverse partitions, permitting fluid flow between compartments 3 and 2, 5 and 4 . . . (n—1) and (n—2) of the other fluid phase from settler compartments to appropriate mixer compartments, openings in the transverse partitions permitting mixed phase fluid flow between compartments 2 and 1, 4 and 3 . . . n and (n—1) means for feeding one fluid phase into compartment n and out at compartment 1, and means for feeding the second fluid phase into compartment (2) and out at compartment (n—1).

Two embodiments of the invention will now be described with reference to the accompanying drawings in which:

FIG. 1 is a perspective view of one embodiment of the invention.

FIG. 2 is a sectional detail on the line II—II of FIG. 1.

FIG. 3 is a sectional detail on the line III—III of FIG. 1.

Figure 4:
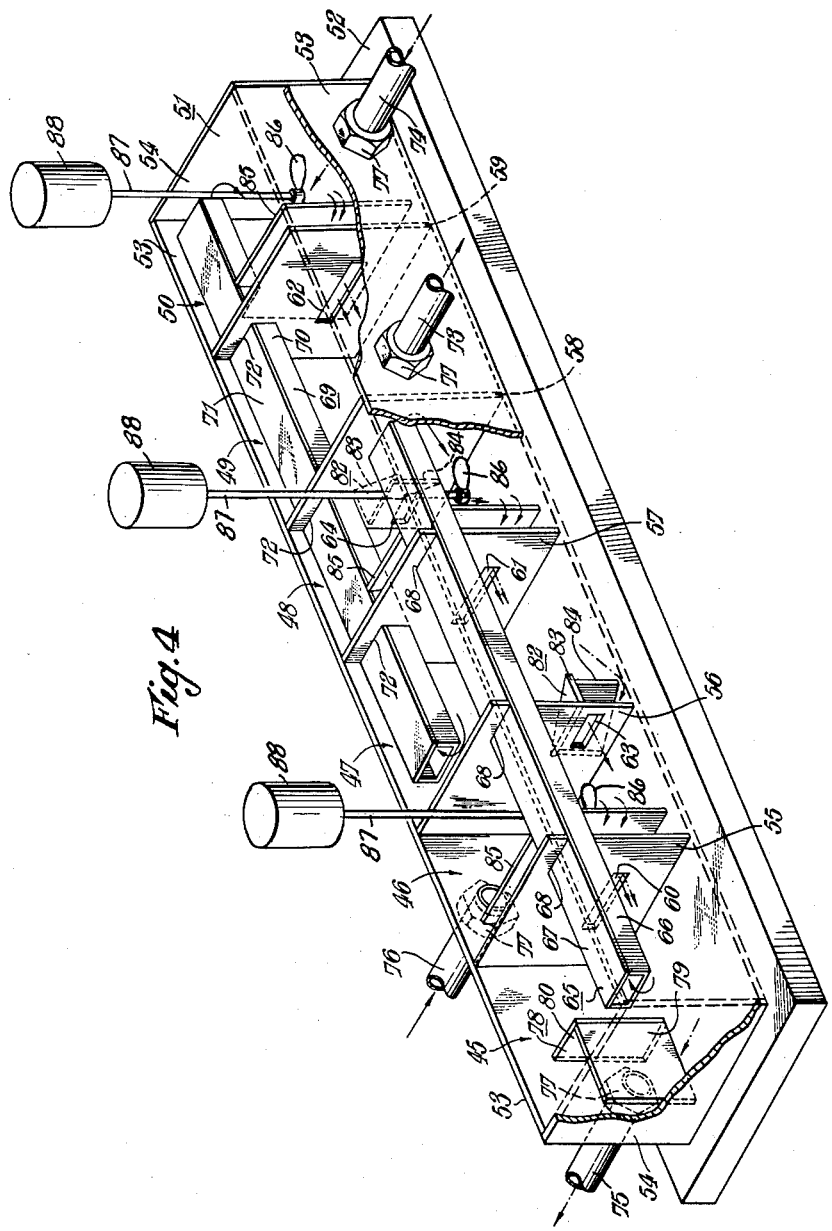
FIG. 4 is a perspective view of a second embodiment of the invention.

In FIG. 1 there is shown an "in line" mixer settler arrangement consisting of four compartments, viz. settler compartments 1 and 3 and mixer compartments 2 and 4. Structurally the mixer settler is in the form of a long square-section through or box 5 having a base 6, longitudinal side walls 7 and end walls 8 and 9 (one of the side walls 7 is shown in dotted outline to expose the inside of the box 5). The box 5 is transversely divided into the four compartments 1, 2, 3 and 4 by partitions 10, 11 and 12. The partitions 10 and 12 have mixed phase ports 13 and 14 for the passage of mixed fluids from the mixer 2 into the settler 1 and from the mixer 4 into the settler 3. The partition 11 has a heavy phase port 15 for the passage of heavy phase from the settler 3 into the mixer 2. The heavy phase port 15 comprises an angled slot 16 and an underflow partition 17. A multiple channel 18 made from longitudinal partitions provides for flow of light phase through the mixer settler. The channel 18 which passes longitudinally from end to end of the box 5 is located at intermediate points in open ended slots 19 in the partition 10 and 11 and 12. The channel 18 comprises a base partition 20, a side partition 21 interrupted to provide weirs 22 and 23, and a side partition 24 interrupted to provide ports 25 and 26. The multiple channel 18 is divided into separate channels 27, 28 and 29 by diagonal partitions 30 and 31. A pipe 32 connects with the channel 27 through the end wall 8 and a well 33. Referring also to FIG. 2 the well 33 comprises a partition 34 located parallel to the end wall 8 and side partitions 35. The partition 34 and the side partitions 35 extend downwards to form an underflow weir 37 to regulate the removal of heavy phase from the settler compartment 1 through a pipe 38 also passing through the end wall 8. Referring back to FIG. 1 a pipe 39 passing through the end wall 9 connects with the channel 29 through a well 40. Referring to FIG. 3 the well 40 comprises a partition 41 located parallel to the end wall 9, side partitions 42 and a base 43. A second pipe 44 passing through the end wall 9 provides for the passage of heavy phase into the mixer compartment 4. The flow of light phase through the mixer settler is as indicated by the full arrows in FIG. 1 while the flow of heavy phase is as indicated by the chain dotted arrows. In use of the mixer settler light phase is admitted through the pipe 32 to the channel 27 and is conveyed therethrough to the mixer compartment 2. In the mixer compartment 2 the light phase is mixed with heavy phase which enters the mixer compartment 2 from the settler compartment 3 through the port 15. The mixed light and heavy phases pass from the mixer compartment 2, via the mixed phase port 13 into the settler compartment 1 where settling takes place; the settled heavy phase being removed via the pipe 38 while the settled light phase tumbles over the weir 22 and passes down the channel 28 into the mixer compartment 4. In the mixer compartment 4 the light phase is mixed with heavy phase entering the compartment 4 through the pipe 44. The mixed heavy and light phases pass from the mixer compartment 4 via the mixed phase port 14 into the settler compartment 3 where settling takes place. The settled heavy phase passes into the mixer compartment 2 through the port 15 while the settled light phase tumbles over the weir 23 and passes down the channel 29 and out through the pipe 39.

In FIG. 4 there is shown a second "in line" mixer settler arrangement consisting of six compartments, viz., settler compartments 45, 47, 49 and mixer compartments 46, 48 and 50. The mixer-settler comprises a long square section through or box 51 having a base 52, longitudinal side walls 53 (one of which is shown partly in dotted outline to expose the inside of the box 5) and end walls 54. The box 51 is transversely divided into the six compartments 45, 46, 47, 48, 49, and 50 by partitions 55, 56, 57, 58 and 59. The partitions 55, 57 and 59 have mixed phase ports 60, 61 and 62 respectively while the partitions 56 and 58 have heavy phase ports 63 and 64. The settler compartment 45 connects with the mixer compartment 48 through a longitudinal channel 65 comprising a U section member 66 covered by a lid 67. The channel 65 passes through slots 68 in the partitions 55, 56 and 57. The settler compartment 47 connects with the mixer compartment 50 through a second channel 69 comprising a U section member 70 covered by a lid 71. The channel 69 passes through slots 72 in the partitions 57, 58 and 59. Pipes 73 and 74 connect respectively with the settler compartment 49 and the mixer compartment 50 through one of the side walls 53 while pipes 75 and 76 connect respectively with the settler compartment 45 and the mixer compartment 46 through the other side wall 53. The pipes 73, 74, 75 and 76 are screwed into the side walls 53 and each is locked in position by a nut 77. The pipe 75 connects with the settler compartment 45 through an underflow weir 78 comprising a partition 79 parallel to the side wall 53 and a side partition 80. The partitions 79 and 80 reach to within about 1/8" of the level of the channels 65 and 69. The heavy phase ports 63 and 64 also have associated underflow weirs 82. Each of the weirs 82 comprises a horizontal triangular part 83 located above the ports 63 or 64 and a vertical partition 84 extending downwards from the part 83 nearly to the base 52 of the box 51. Transverse baffle plates 85 are located in each of the mixer compartments 46, 48 and 50. The baffle plates 85 reach to the bottom of the compartments 46, 48 and 50 but stop short of the side walls 53. The flow of light phase through the mixer settler is as indicated by the full arrows in FIG. 4 while the flow of heavy phase is as indicated by the chain dotted arrows.

In use of the mixer settler light phase is admitted through the pipe 76 into the mixer compartment 46. In the compartment 46 the light phase is mixed with heavy phase entering the mixer compartment 46 from the settler compartment 47 through the heavy phase port 63. The mixed light and heavy phases pass from the mixer compartment 46 through the mixed phase port 60 into the settler compartment 45 where settling takes place. The settled heavy phase is removed from the settler compartment 45 via the pipe 75 while the settled light phase is passed through the channel 65 into the mixer compartment 48. In the mixer compartment 48 the entering light phase is mixed with heavy phase entering from the settler compartment 49 through the heavy phase port 64. The mixed heavy and light phases pass through the mixer phase port 61 into the settler compartment 47 where settling takes place. The settled heavy phase passes from the settler compartment 47 into the mixer compartment 46 via the heavy phase port 63, while the settled light phase is passed through the channel 69 into the mixer compartment 50. In the mixer compartment 50 the entering light phase is mixed with heavy phase entering through the pipe 74. The mixed heavy and light phases pass from the mixer compartment 50, through the mixed phase port 62, into the settler compartment 49, where settling takes place. The settled heavy phase passes into the mixer compartment 48, through the heavy phase port 64, while the settled light phase is removed from the settler compartment 49, through the pipe 73. The baffle plates 85 in the mixer compartments 46, 48 and 50 prevent mixed phases being forcibly ejected through the respective mixed phase ports 60, 61 and 62. Mixing of light and heavy phases in the mixer compartments of the two embodiments may be effected by conventional stirrers, etc., or by the pulse mixing method described in our co-pending U.S. application Ser. No. 707,994, of even date herewith, which is particularly applicable to the embodiment in FIG. 1, as the position of the channel 18 makes the use of conventional stirrers difficult.

As an example of the use of conventional stirrers, as shown in FIGS. 1 and 4, the mixing of the phases in the mixer compartments, 2, 4 and 46, 48, 50, can be achieved by rotating paddles 86 mounted on vertical shafts 87 driven by motors 88. Appropriate leak proof journal bearings 89 may be necessary to permit the shafts 87 in FIGURE 1 to pass through the various channels.

We claim:

1. In mixer-settler apparatus for contacting two substantially immiscible fluid phases of differing densities, an elongated trough divided into an even number of compartments arranged in tandem, the even numbered compartments from one end of the trough being mixer compartments and the odd numbered compartments from said end being settler compartments, inlet duct means communicating at an upper level with the first of said mixer compartments for introducing a light phase fluid therein, inlet duct means communicating at a lower level with the last of said mixer compartments for introducing a heavy phase fluid therein, outlet duct means communicating at an upper level with the last of said settler compartments for removing light phase fluid therefrom, outlet duct means communicating at a lower level with the first of said settler compartments for removing heavy phase fluid therefrom, each but the first said settler compartment communicatnig at a lower level with the mixer compartment immediately preceding for heavy phase fluid flow thereto, each settler compartment communicating at an upper level with the second succeeding mixer compartment for light phase fluid flow thereto, each mixer compartment communicating at an intermediate level with the settler compartment immediately preceding for mixed phase fluid flow thereto, and liquid mixing means in the mixer compartments.

2. Apparatus according to claim 1 wherein each said settler compartment communicates at an upper level with the second succeeding mixer compartment through duct means extending substantially horizontally at an upper level in the trough.

References Cited in the file of this patent
UNITED STATES PATENTS

| 2,682,452 | Wainwright | June 29, 1954 |
| 2,701,753 | Eisenlohr et al. | Feb. 8, 1955 |
| 2,754,179 | Whatley | July 10, 1956 |
| 2,845,936 | Boynton et al. | Aug. 5, 1958 |

OTHER REFERENCES

Sege et al.: Chem. Eng. Progress, August 1954, vol. 50, #8, pages 403–408.